United States Patent
Cervinka et al.

(10) Patent No.: US 9,351,242 B2
(45) Date of Patent: May 24, 2016

(54) TRACKING OF AND COMMUNICATION WITH MOBILE TERMINALS USING A BATTERY-POWERED WIRELESS NETWORK INFRASTRUCTURE

(76) Inventors: Alexandre Cervinka, Montréal (CA); Yvan Castilloux, San Francisco, CA (US)

( * ) Notice: Subject to any disclaimer, the term of this patent is extended or adjusted under 35 U.S.C. 154(b) by 333 days.

(21) Appl. No.: 12/675,649

(22) PCT Filed: Sep. 1, 2008

(86) PCT No.: PCT/IB2008/002262
§ 371 (c)(1),
(2), (4) Date: Mar. 12, 2010

(87) PCT Pub. No.: WO2009/027816
PCT Pub. Date: Mar. 5, 2009

(65) Prior Publication Data
US 2010/0302011 A1  Dec. 2, 2010

(30) Foreign Application Priority Data

Aug. 31, 2007 (CA) ..................................... 2599471
Oct. 29, 2007 (CA) ..................................... 2608469

(51) Int. Cl.
*H04Q 5/22* (2006.01)
*H04W 52/02* (2009.01)
(Continued)

(52) U.S. Cl.
CPC ...... *H04W 52/0206* (2013.01); *H04W 52/0216* (2013.01); *H04W 60/00* (2013.01); *H04W 84/18* (2013.01); *Y02B 60/50* (2013.01)

(58) Field of Classification Search
CPC .................... H04W 52/0206; H04W 52/0216; H04W 56/0015; H04W 52/0203; H04W 52/0212; H04W 52/0219; H04W 52/0222; H04W 52/0229; H04W 64/003; H04W 72/1289; H04W 72/1273; H04W 88/14; H04W 60/00; H04W 60/04; H04W 48/18; H04W 48/16
USPC ......... 340/10.1, 10.2, 10.3, 10.4, 10.5, 572.1, 340/573.1, 539.11, 10.31, 7.32, 7.36, 7.37; 455/572–574, 127.5, 421, 127.1, 474, 455/561, 334, 435.1, 435.2, 435.3, 455/450–454, 458; 370/311, 350, 336, 328, 370/335, 252
See application file for complete search history.

(56) References Cited

U.S. PATENT DOCUMENTS 7,535,881 B2 * 5/2009 Maekawa et al. ............. 370/338
7,817,014 B2 * 10/2010 Krishna et al. ............... 340/10.4

(Continued)

FOREIGN PATENT DOCUMENTS

| EP | 1783666 | 5/2007 |
|---|---|---|
| WO | WO 2006/102183 | 9/2006 |
| WO | WO 2007/092520 | 8/2007 |

*Primary Examiner* — Steven Lim
*Assistant Examiner* — Mancil Littlejohn, Jr.
(74) *Attorney, Agent, or Firm* — Robert Brouillette; Brouillette & Partners (57) ABSTRACT

There is provided a method of reducing energy consumption of network infrastructure nodes in a wireless network, the method comprising: (a) turning a transmitter and a receiver of the network infrastructure node to a power-off state; b) powering-on the transmitter of the network infrastructure node for a limited transmission time frame; c) during the transmission time frame, transmitting a beacon message comprising an identifier of the network infrastructure node, channel characteristics of the network infrastructure node and a powering-on schedule of the receiver of the network infrastructure node, for allowing mobile terminal nodes in the network to communicate with the network infrastructure node, where the mobile terminal nodes are almost continuously in a power-on state; d) powering-on the receiver of the network infrastructure node during a limited reception time frame in accordance with the schedule, for enabling the receiver to receive messages transmitted by the mobile terminal nodes in the network if required; e) repeating steps a) to d) periodically. There is further provided a battery-powered network infrastructure node which reduces energy consumption. There is further provided a battery-powered wireless network with an energy management for network infrastructure node. There is further provided a method of increasing probability of detection of rapidly moving clusters of mobile terminal nodes in a wireless network.

20 Claims, 2 Drawing Sheets

(51) Int. Cl.
    *H04W 60/00*     (2009.01)
    *H04W 84/18*     (2009.01)

(56) References Cited

U.S. PATENT DOCUMENTS

| | | | |
|---|---|---|---|
| 7,944,338 B2 * | 5/2011 | Nemoto et al. | 340/10.34 |
| 8,294,568 B2 * | 10/2012 | Barrett | 340/539.11 |
| 2004/0100394 A1 * | 5/2004 | Hitt | 340/870.11 |
| 2005/0176382 A1 * | 8/2005 | Mochizuki et al. | 455/78 |
| 2006/0022800 A1 | 2/2006 | Krishna et al. | |
| 2006/0244588 A1 * | 11/2006 | Hannah et al. | 340/539.13 |
| 2006/0253735 A1 * | 11/2006 | Kwak et al. | 714/12 |
| 2007/0185748 A1 * | 8/2007 | Anderson et al. | 705/7 |

* cited by examiner

TRACKING OF AND COMMUNICATION WITH MOBILE TERMINALS USING A BATTERY-POWERED WIRELESS NETWORK INFRASTRUCTURE

CROSS-REFERENCE TO RELATED APPLICATIONS

The present patent application claims the benefits of priority of Canadian Patent Application No. 2,559,471, filed on Aug. 31, 2007, at the Canadian Intellectual Property Office and entitled: "Underground communication network system for personal tracking and HVAC control".

FIELD OF THE INVENTION

The present invention generally relates to the field of wireless telecommunication networks. The invention more particularly concerns Tracking of and Communication with Mobile Terminals using a Battery-Powered Wireless Network Infrastructure.

BACKGROUND OF THE INVENTION

With the advent of the Internet and the ever increasing miniaturization and integration of electronic circuits, new possibilities have begun to emerge in the field of data communication networks.

Several applications, such as industrial automation and monitoring, localization of personal and assets, and defense and security management, have specific requirements that cannot be met with wired networks or existing wireless networks.

In order to provide a solution for these types of applications, significant new research has been conducted in the past ten years to develop new and more efficient wireless network systems and protocols.

This research has resulted in the appearance of a plethora of proprietary and non-proprietary wireless networking technologies. Some, such as WLAN (IEEE 802.11), WiMAX (IEEE 802.16), Bluetooth (IEEE 802.15.1), ZigBee (IEEE 802.15) and the upcoming SP100 protocol are standard non-proprietary wireless networking protocols. Standard networking technologies generally involve trade-offs between numerous competing issues (scalability, topology, energy consumption, range, frequency, etc.). They are therefore difficult to adequately tailor to the specific needs of particular applications. This invention, in contrast, does not operate on a standard and can be tailored with a high degree of specificity to particular applications. This invention is also different from other proprietary network protocols, such as the TSMP from Dust Networks and the SensiNet® from Sensicast, two other non-standard wireless networking protocols.

Beacon-based networks have been implemented in some cases. While these networks have facilitated some useful advances, they either only operate in star configurations or consume too much energy to be battery-powered. Many applications mandate a mesh network that is highly scalable, in terms of the maximum number of hops and node density for which the network remains reliable. Many applications also require a network connection time in the order of seconds. Mesh network techniques that rely on central synchronization cannot meet these demands.

Ad hoc communication in mesh networks usually implies local allocation of communication resources without a central host. Low energy consumption must prevail in allocating these resources.

Real-time tracking of mobile terminals in underground or confined environments (e.g. underground mines, navy vessels) is challenging because: (1) Mobile terminals cannot receive satellite or cellular signals from Wide Area Networks (WAN) [e.g. GPS does not work]; (2) Deploying Local Area Network (LAN) infrastructure is prohibitively expensive, operationally impractical and/or unreliable because (a) RF signal propagation is non-line-of-sight and confined to tunnels, corridors or rooms with waveguide constraints; (b) Power outlets are scarce and installing additional power wiring, connectors and adapters is a tedious undertaking; (c) Many sites are in remote areas and/or in developing countries where skilled labor for installation and maintenance of telecom networks are in short supply; (d) Wiring is prone to damage.

From the foregoing, it appears that there is a need for a novel wireless network technology which obviates the above-mentioned drawbacks.

SUMMARY OF THE INVENTION

As a first aspect of the invention, there is provided a method of reducing energy consumption of network infrastructure nodes in a wireless network, the method comprising:

a) turning a transmitter and a receiver of the network infrastructure node to a power-off state;

b) powering-on the transmitter of the network infrastructure node for a limited transmission time frame;

c) during the transmission time frame, transmitting a beacon message comprising an identifier of the network infrastructure node, channel characteristics of the network infrastructure node and a powering-on schedule of the receiver of the network infrastructure node, for allowing mobile terminal nodes in the network to communicate with the network infrastructure node, where the mobile terminal nodes are almost continuously in a power-on state;

d) powering-on the receiver of the network infrastructure node during a limited reception time frame in accordance with the schedule, for enabling the receiver to receive messages transmitted by the mobile terminal nodes in the network if required;

e) repeating steps a) to d) periodically.

As a further aspect of the invention, there is provided a network infrastructure node in a wireless network comprising:

a transmitter;

a receiver;

a processing unit configured to turn a transmitter and a receiver of the network infrastructure node to a power-off state, to power-on the transmitter of the network infrastructure node for a limited transmission time frame, to transmit, during the transmission time frame, a beacon message comprising an identifier of the network infrastructure node, channel characteristics of the network infrastructure node and a powering-on schedule of the receiver of the network infrastructure node for allowing mobile terminal nodes in the network to communicate with the network infrastructure node, and to power-on the receiver of the network infrastructure node during a limited reception time frame in accordance with the schedule for enabling the receiver to receive messages transmitted by mobile terminal nodes in the network if required.

As another aspect of the invention, there is provided a wireless network comprising a plurality of mobile terminal nodes and a plurality of network infrastructure nodes, where network infrastructure nodes are configured to be continuously in a power-off state except during prescheduled reception and transmission time frames, and where mobile terminal nodes are configured to be almost continuously in a power-on state, where the mobile terminal nodes and network infrastructure nodes exchange messages therebetween in order for each mobile terminal node to be connected to one network infrastructure node in the network.

As another aspect of the invention, there is provided a computer-readable medium containing instructions for controlling at least one processor to perform a method of reducing energy consumption in network infrastructure node in a wireless network, the method comprising:

a) turning a transmitter and a receiver of the network infrastructure node to a power-off state;

b) powering-on the transmitter of the network infrastructure node for a limited transmission time frame;

c) during the transmission time frame, transmitting a beacon message comprising an identifier of the network infrastructure node, channel characteristics of the network infrastructure node and a powering-on schedule of the receiver of the network infrastructure node, for allowing mobile terminal nodes in the network to communicate with the network infrastructure node, where the mobile terminal nodes are almost continuously in a power-on state;

d) powering-on the receiver of the network infrastructure node during a limited reception time frame in accordance with the schedule, for enabling the receiver to receive messages transmitted by the mobile terminal nodes in the network if required;

e) repeating steps a) to d) periodically.

Preferably, the wireless network comprises a tracking wireless network.

Preferably, the network infrastructure nodes and the mobile terminal nodes are battery-powered.

Preferably, the wireless network comprises an ad-hoc, multi-node wireless network.

Preferably, the wireless network comprises a wireless sensor network.

As a further aspect of the invention, there is provided a method of increasing probability of detection of rapidly moving clusters of mobile terminal nodes in a wireless network, the method comprising:

organizing nodes in the wireless network into a hierarchy of tiers comprising:

a first tier comprising a plurality of personal mobile terminal nodes;

a second tier comprising at least one vehicle hybrid infrastructure-mobile node; and a third tier comprising at least one network infrastructure node;

wherein the plurality of personal mobile terminal nodes connect to a nearest vehicle hybrid infrastructure-mobile node among the at least one vehicle hybrid infrastructure-mobile node, and each one of the at least one vehicle hybrid infrastructure-mobile node connect to a nearest network infrastructure node among the at least one network infrastructure node;

exchanging data messages between the nearest vehicle hybrid infrastructure-mobile node and the nearest network infrastructure node, where the messages comprise data in association with the plurality of personal mobile terminal nodes.

Preferably, the wireless network is a batter-powered mesh network.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

Novel methods, devices and systems for Tracking of and Communication with Mobile Terminals using a Battery-Powered Wireless Network Infrastructure will be described hereinafter. Although the invention is described in terms of specific illustrative embodiments, it is to be understood that the embodiments described herein are by way of example only and that the scope of the invention is not intended to be limited thereby.

Being directed to a network technology comprising different aspects, these different aspects shall now be described separately.

The system and method of the present invention are most preferably embodied in a wireless network system and are generally most advantageously applied to networks requiring low energy consumption such as sensor networks. However, the system and method of the present invention may be applied to other fields such as, but not limited to, personal, vehicle and asset tracking and mobile communications in underground mines, navy vessels, and military persistent surveillance field deployments; the present invention is not so limited.

The network system of the present invention generally consists of a plurality of substantially structurally identical wireless network infrastructure nodes and mobile terminal nodes. Identical nodes enable more efficient network deployment because any node can be installed at any location without affecting network functioning. Moreover, malfunctioning or damaged nodes can be replaced easily and on short notice.

In one embodiment of the invention, communication occurs between a network infrastructure node and a mobile terminal node. Each network infrastructure node has its own time and frequency synchronization.

A major distinction of the present invention with respect to the prior art is that a node is not provided with multiple antennas and transceivers. Each node of the present invention is provided with a single antenna and a single transceiver. The ability to be synchronized with more than one clock and with more than one frequency hopping sequence is provided by the proprietary software embedded in each wireless node.

Compared to previous art, all the roles in this embodiment have routing capabilities regardless of how frequently they transmit beacons. The role of each node in the network will adapt according to the local radio-frequency ("RF") environment, node density, throughput requirements, energy consumption, and required routing. Beacon transmission is globally reduced to a minimum in this embodiment of a beacon-based mesh network.

The process is enabled by the transmission of beacons by the network infrastructure nodes. The mobile terminal nodes receive the different beacons and connect to the closest network infrastructure node.

As a first aspect of the invention, there is provided a method of energy management of network infrastructure nodes in a wireless network.

According to the preferred embodiment, the wireless network consists of an ad hoc battery-powered mesh network mounted in an underground area such as mines or in a confined area such as navy vessels. Since physical access to such areas is most of the time very difficult and cable installation is sometimes impossible, there is a need for a wireless network that would be battery-powered and that would minimize human intervention. The human intervention is minimized if the network is self healing and if the power battery of the network infrastructure nodes can last the longest time possible.

The first purpose of the conceived wireless network in accordance with the preferred embodiment is to track personnel and machinery inside underground mines.

Network infrastructure nodes are mounted in different zones of the underground mine or navy vessel in order to track presence of personal and machinery. Personal and machinery are tagged with battery-powered or machine-powered mobile terminal nodes which continuously communicate with the nearest network infrastructure node. The process of communication between the mobile terminal node and network infrastructure node is a novel aspect of the present invention, since it is conceived to minimize energy consumption of the network infrastructure node.

Figure 1:
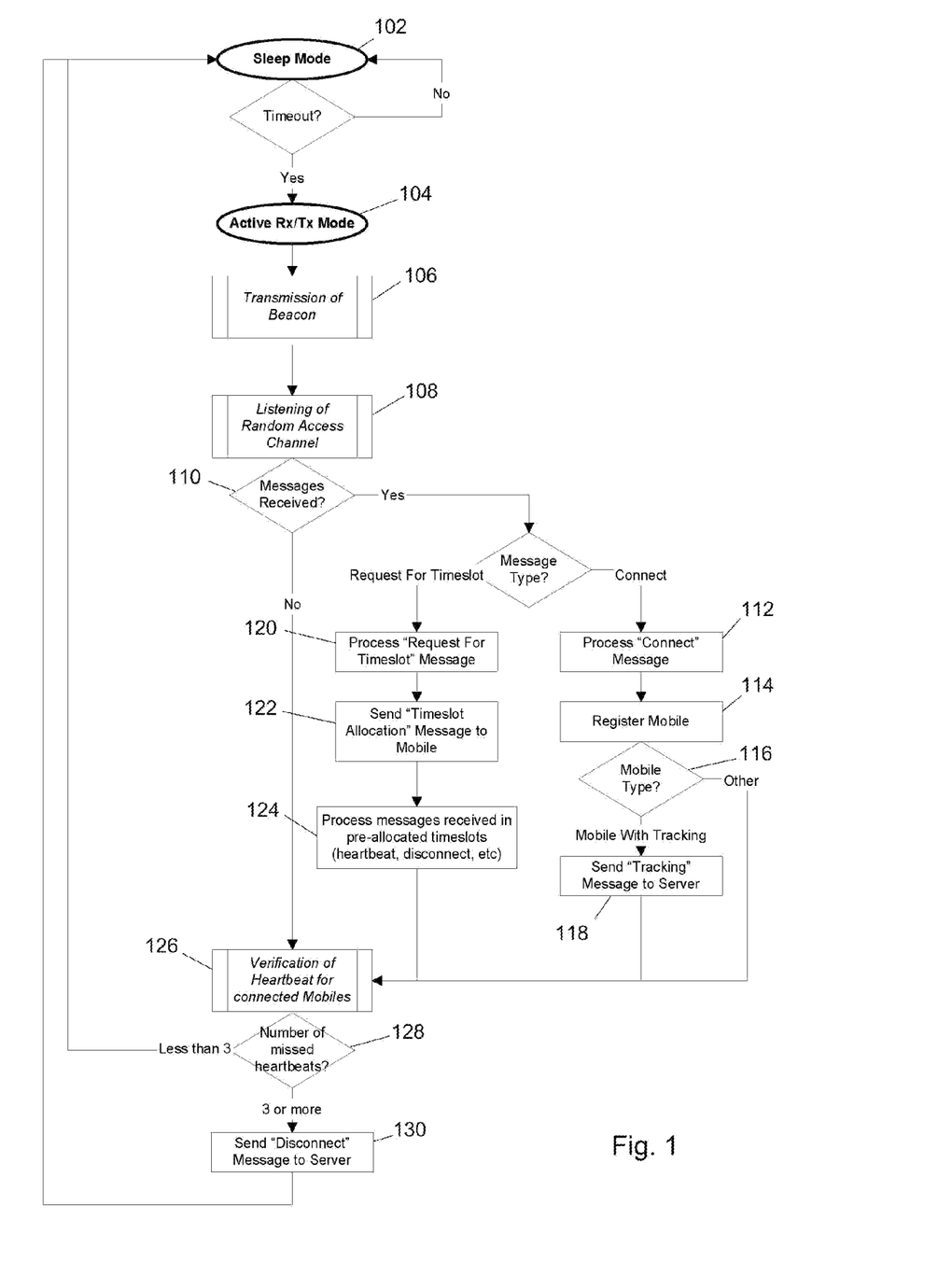
FIG. 1 is a flow chart of an embodiment of the communication protocol between network infrastructure nodes and mobile terminal nodes viewed from the network infrastructure node perspective.
Figure 2:
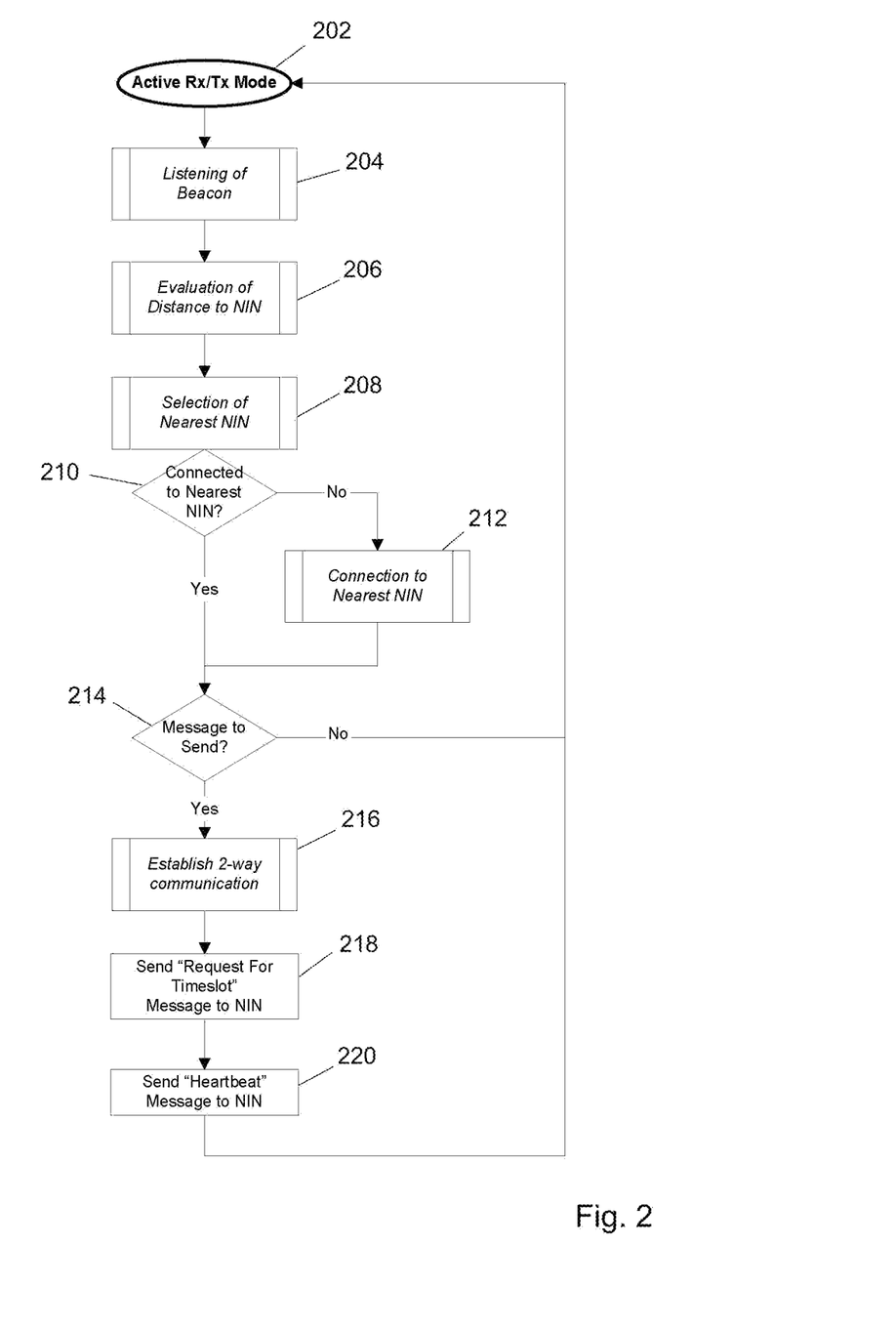
FIG. 2 is a flow chart of an embodiment of the communication protocol between network infrastructure nodes and mobile terminal nodes viewed from the mobile terminal node perspective.

With reference to FIGS. 1 and 2, the communication protocol between mobile terminal nodes and network infrastructure nodes can be described as follows:

Activities of the Network Infrastructure Node (see FIG. 1):

The NETWORK INFRASTRUCTURE NODE IS IN DEEP SLEEP MODE (at 102) EXCEPT WHEN EXECUTING THE FOLLOWING PROCESSES (at 104 and following):

1-PERIODIC TRANSMISSION OF BEACON (at 106):
NODE ID (UNIQUE FOR EACH NETWORK INFRASTRUCTURE NODE)
CHANNEL PARAMETERS (UNIQUE FOR EACH NETWORK INFRASTRUCTURE NODE)
NEXT TIME SLOT WHEN THE RECEIVER IS ON FOR RANDOM ACCESS TO INITIATE CONNECTION (UNIQUE FOR EACH NETWORK INFRASTRUCTURE NODE)
ON-DEMAND ALLOCATION OF TIME SLOTS TO SPECIFIC MOBILE TERMINAL NODES FOR BI-DIRECTIONAL COMMUNICATIONS (I.E. CSMA IS NOT USED ONCE A CONNECTION IS ESTABLISHED)
BACKHAUL NETWORKING OPTION ON/OFF
TRACKING CAPABILITY OPTION ON/OFF
SIZE OF TRACKING CELL/ZONE (E.G. SMALL, MEDIUM, LARGE)
Example:
A beacon is sent once per frame in a pre-defined time slot. A frame is a collection of 50 pre-defined time slots, each lasting 13 ms. The time the beacon is transmitted defines the time synchronization for that network infrastructure node.
Message is 64 bits:
Bits [0-4]: Msg Type (MSG_BEACON =0)
Bits [5-20]: Network Infrastructure Node ID
Bits [21-52]: Frequency Hopping Random Seed
Bits [53-56]: Beacon Time Offset
Bits [57-58]: Tracking Node Type (Tracking OFF (0), Tracking ON with small (1), medium (2), large coverage areas (3))
Bits [59]: Backhaul communication ON/OFF
Bits [60-63]: Reserved for other services
The frequency hopping random seed is unique per network infrastructure node. It defines the channel that will be used for communication for each time slot.

2-PERMANENT CONNECTIONS WITH NEIGHBORING NETWORK INFRASTRUCTURE NODES FOR BACKHAUL COMMUNICATIONS TO CENTRAL SERVER (USING PRIOR ART LOW POWER STAR OR MESH NETWORKING TECHNOLOGIES)

3-RECEPTION OF 1) CONNECTION AND 2) REQUEST_FOR_COMMUNICATION_TIMESLOTS MESSAGES(*) FROM MOBILE TERMINAL NODES ON RANDOM ACCESS CHANNEL (at 108 and 110)
Example:
Reception of connection message must be received within 1 ms of beginning of allocated time slot.
The connection message has 64 bits.
Bits [0-4]: Msg Type (MSG_CONNECTION =1)
Bits [5-20]: Mobile Terminal Node ID
Bits [21-36]: Network Infrastructure Node ID
Bits [37-41]: Device Type (MOBILE_WITH_TRACKING (0), MOBILE_WITHOUT_TRACKING(1), LEAF (2), ROUTER (3))
Bits [42-49]: Application bits (for example, engine and ignition state)
Bits [50-53]: Tracking error function for server-level intelligence
Bits [54-63]: Reserved
The Request for communication time slots message has 64 bits:
Bits [0-4]: Msg Type (REQUEST_FOR_COMMUNICATION_TIME_SLOTS =2)
Bits [5-20]: Mobile Terminal Node ID
Bits [21-36]: Network Infrastructure Node ID
Bits [37-52]: Number of requested time slots
The mobile terminal node requests for time slot when it needs to send a message to the network infrastructure node.

4-ON-DEMAND CONNECTION WITH MOBILE TERMINAL NODES FOR TWO-WAY COMMUNICATIONS (E.G. PERIODIC HEARTBEAT, SENSOR DATA, ACKNOWLEDGMENT, CONFIGURATION PARAMETERS)
Example:
When the network infrastructure node receives a connection attempt from a mobile terminal node (at 112), it registers the node (at 114). If the node is of type MOBILE_WITH_TRACKING (at 116), it will guarantee the transmission of the tracking message to the server (at 118). From then on, the network infrastructure node will allocate specific time slots for communication as requested by the mobile terminal node or needed by it.

When the mobile terminal node requests for communication time slots (at 120), the network infrastructure node sends an allocation message in another pre-defined time slot which defines the communication time slots (at 122), in which the mobile terminal node may send information (at 124).

When the network infrastructure node wants to send a message, it sends an allocation message which specifies the time slot of communication.

5-EVENT-DRIVEN TRANSMISSION OF MOBILE TERMINAL NODE CONNECT/DISCONNECT MESSAGE(**) (BASED ON PRESENCE/ABSENCE OF PERIODIC MOBILE TERMINAL NODE HEARTBEAT) TO CENTRAL SERVER
Example:
The mobile terminal node sends a heartbeat every minute to the network infrastructure node. If 3 are not received in a row (at 126 and 128), it is considered not connected. At that point, a disconnection message is sent to the server (at 130) with a time stamp.

Hardware options of the Network Infrastructure Nodes:

Hardware Component options:

Low Power Microcontroller options: Texas Instrument MSP430F1612, Jennic JN5139

Low Power Transceiver options: Semtech XE1203, Chipcon CC2420

Primary Battery options: Tadiran lithium thionyl chloride primary batteries

Energy Harvesting options: Nanosolar solar cells combined with a lithium-ion rechargeable battery Integrated Hardware Platform Option #1: All processes mentioned hereinabove related to the communications with network infrastructure nodes are implemented using the same microcontroller and transceiver. Power is supplied by a primary battery or an energy harvesting mechanism.

Integrated Hardware Platform Option #2: All processes mentioned hereinabove related to communications with mobile terminal nodes are implemented on one microcontroller/transceiver pair, and all processes related to backhaul communications to a central server are implemented on a 2nd microcontroller/transceiver pair. Communications between processes on two microcontrollers is done via SPI, UART or RS-232. Power is supplied by a primary battery or an energy harvesting mechanism.

Activities of the Mobile Terminal Nodes(see FIG. 2):

MOBILE TERMINAL NODE EXECUTES THE FOLLOWING PROCESSES:

1-CONTINUOUSLY LISTENS FOR NETWORK INFRASTRUCTURE NODE BEACONS (at 202 and 204)

Example:

Use 8 different beacon frequencies that are common for all network infrastructure nodes. These frequencies are connection frequencies. The mobile terminal node listens to one of them at a time for a duration that is equal to the period of these connection frequencies. For instance, the period could be is 19 frames with 50 time slots of 13 ms=12.350 seconds.

2-USES THE BEACON TO EVALUATE THE RSSI, TOF OR OTHER RF LINK PARAMETERS WITH NETWORK INFRASTRUCTURE NODES WHICH HAVE TRACKING ON

Example:

The mobile terminal node measures the RSSI of the network infrastructure nodes around it. If one of them has not been evaluated recently and its RSSI is stronger than a threshold or is the strongest, it will decide to connection to it for further evaluation.

3-ATTEMPTS TO DETERMINE THE NEAREST NETWORK INFRASTRUCTURE NODE BY CONSIDERING INSTANTANEOUS AND/OR HISTORICAL RF LINK DATA (WHICH HAS TRACKING ON AND WHOSE RF LINK PARAMETERS MEET THE RF SIGNAL STRENGTH OR TIME OF FLIGHT REQUIREMENTS SPECIFIED IN ITS BEACON) (at 206)

Example:

The mobile terminal node will make further evaluation of the network infrastructure node while monitoring the other network infrastructure nodes around it. If the RSSI signature meets the requirements of a network infrastructure node that is the closest, it will decide to connect to it (at 208, 210 and 212).

4-TRANSMITS 1) CONNECTION OR 2) REQUEST_FOR_COMMUNICATION MESSAGES (*) ON THE RANDOM ACCESS CHANNEL OF THE SELECTED NEAREST NETWORK INFRASTRUCTURE NODE (PREFERABLY) OR ANY OTHER NETWORK INFRASTRUCTURE NODE WITH:

CONNECTION MESSAGE:
 MOBILE TERMINAL NODE ID
 NETWORK INFRASTRUCTURE NODE ID
 NEAREST NETWORK INFRASTRUCTURE NODE ESTIMATION ERROR FUNCTION PARAMETERS
 SHORT APPLICATION PAYLOAD (OPTIONAL, FOR INSTANCE MESSAGE (**))

REQUEST FOR COMMUNICATION TIME SLOT MESSAGE:
 MOBILE TERMINAL NODE ID
 NETWORK INFRASTRUCTURE NODE ID
 NUMBER OF REQUESTED TIME SLOTS

Example:

While it is connected to it, it will monitor its RSSI signature in order to determine if it is going out of range of the coverage area which defined by the Tracking Node Type. If it does, it will attempt to send a disconnection message. Then it will go back to step 1.

The connection message has 64 bits.
 Bits [0-4]: Msg Type (MSG_CONNECTION =1)
 Bits [5-20]: Mobile Terminal Node ID
 Bits [21-36]: Network Infrastructure Node ID
 Bits [37-41]: Device Type (MOBILE_WITH_TRACKING (0), MOBILE_WITHOUT_TRACKING (1), LEAF (2), ROUTER (3))
 Bits [42-49]: Application bits (for example, engine and ignition state)
 Bits [50-53]: Tracking error function for server-level intelligence
 Bits [54-63]: Reserved The Request for communication time slots message has 64 bits:
 Bits [0-4]: Msg Type (REQUEST_FOR_COMMUNICATION_TIME_SLOTS =2)
 Bits [5-20]: Mobile Terminal Node ID
 Bits [21-36]: Network Infrastructure Node ID
 Bits [37-52]: Number of requested time slots 5-ESTABLISHES TWO-WAY CONNECTION WITH THE SELECTED NEAREST NETWORK INFRASTRUCTURE NODE (PREFERABLY) (at 216) OR ANY OTHER NETWORK INFRASTRUCTURE NODE AND EXCHANGES PERIODIC HEARTBEAT (at 220)

Example:

The connection is done with the connection message as in 4.

Definition of how communication are requested is done in the infrastructure section. Here's a repetition:

The Request for communication time slots message has 64 bits:
 Bits [0-4]: Msg Type (REQUEST_FOR_COMMUNICATION_TIME_SLOTS =2)
 Bits [5-20]: Mobile Terminal Node ID
 Bits [21-36]: Network Infrastructure Node ID
 Bits [37-52]: Number of requested time slots The mobile requests for time slot when it needs to send a message to the network infrastructure node (at 218).

When the mobile terminal node requests for communication time slots, the network infrastructure node sends an allocation message in another pre-defined time slot which defines the communication time slots, in which the mobile terminal node may send information.

When the network infrastructure node wants to send a message, it sends an allocation message which specifies the time slot of communication.

6-NETWORK INFRASTRUCTURE NODE IS RESPONSIBLE FOR THE GUARANTEED DELIVERY OF THE MOBILE TERMINAL NODE MESSAGES TO THE CENTRAL SERVER

Example:

The network infrastructure node will send through the backhaul a tracking message of 128 bits.

Bits [0-4]: Msg Type (APPLICATION_PAYLOAD =3)
Bits [5-20]: Network Infrastructure Node ID
Bits [21-36]: Target ID (in this case SERVER_ID)
Bits [37-47]: Reserved
Bits [48-55]: Application Msg Type (TRACKING =0)
Bits [56-71]: Mobile ID
Bits [72-103] Time of Occurrence
Bits [104-111]: Tracking Error function parameters
Bits [112-127]: Reserved An acknowledgement will be received from the server if it was received.

Hardware options of the Mobile Terminal Nodes:
Hardware components options:
Low Power Microcontroller options: Texas Instrument MSP430F1612, Jennic JN5139
Low Power Transceiver options: Semtech XE1203, Chipcon CC2420
Primary Battery options: Tadiran lithium thionyl chloride primary batteries
Energy Harvesting options: Nanosolar solar cells combined with a lithium-ion rechargeable battery
Rechargeable Battery options: Lithium-ion battery recharged frequently as part of normal operations (e.g. miner cap lamp, first responder mobile terminal)
Line power options: Vehicle or machinery power bus
Hardware Platform Option #1: All processes mentioned hereinabove related to the mobile terminal nodes are implemented using the same microcontroller and transceiver. Power is supplied by a rechargeable battery, line power, a primary battery or an energy harvesting mechanism.

From a higher level abstract, the activities of the mobile terminal node and network infrastructure node can be illustrated as follow:

1. Network infrastructure node in deep sleep mode periodically wakes up to send a synchronization message every X seconds;
2. Mobile terminal node is able to determine the nearest network infrastructure node by listening to the synchronization messages of network infrastructure nodes:
   a. In the preferred embodiment based on Frequency Hopping Spread Spectrum (FHSS), the mobile terminal node measures the Received Signal Strength (RSSI) by listening to the synchronization message.
   b. In an alternative embodiment based on Chirp Spread Spectrum (CSS), the mobile terminal node measure Round-Trip Time-Of-Flight (RTTOF) by listening to the synchronization message.
3. Mobile terminal node listens until it captures the synchronization message required to initiate bi-directional communications with the network infrastructure node:
   a. In the preferred embodiment based on FHSS, the synchronization message has the random seed of the communication channels (i.e. frequencies and time slots). Its time of reception gives the asynchronous time base of the network infrastructure node.
4. In order to maximize its sleep time, the network infrastructure node allocates specific time slots for communications with the mobile terminal node. One time slot is always allocated for tracking messages. This time slot will be referred to as the "random-access time slot":
   a. In the preferred embodiment based on FHSS, the network infrastructure node allocates both frequency channels and time slots for communications
5. After interpreting the RSSI and/or RTTOF measurements, the mobile terminal node decides whether to send a tracking message to the network infrastructure node in the random-access time slot.
   a. In the preferred embodiment, the interpretation is made with a log of previous RSSI measurements, which can be made at different frequencies or channels, from surrounding network infrastructure nodes. The tracking message contains the time of occurrence of tracking, the network address of the mobile terminal node and qualitative RSSI information.
6. Network infrastructure node forwards the tracking message to the battery-powered wireless mesh network router for transmission to a central server.

As a further aspect of the invention, there is provided a method to increase probability of detection of rapidly moving clusters of mobile terminal nodes in a battery-powered mesh network.

Hybrid infrastructure mobile terminal node on vehicle to track clusters of mobile terminal nodes moving at high speed:

NETWORK INFRASTRUCTURE NODE "PART/PORTION" EXECUTES THE FOLLOWING PROCESSES:
1B-PERIODIC TRANSMISSION OF BEACON:
NODE ID (UNIQUE FOR EACH NETWORK INFRASTRUCTURE NODE)
CHANNEL PARAMETERS (UNIQUE FOR EACH NETWORK INFRASTRUCTURE NODE)
NEXT TIME SLOT WHEN THE RECEIVER IS ON FOR RANDOM ACCESS TO INITIATE CONNECTION (UNIQUE FOR EACH NETWORK INFRASTRUCTURE NODE)
ON-DEMAND ALLOCATION OF TIME SLOTS TO SPECIFIC MOBILE TERMINAL NODES FOR BI-DIRECTIONAL COMMUNICATIONS
BACKHAUL NETWORKING OPTION ON/OFF
TRACKING CAPABILITY OPTION ON/OFF
RF SIGNAL STRENGTH OR TIME OF FLIGHT DEFINING SIZE OF TRACKING CELL/ZONE
2B-RECEPTION OF MESSAGES(*) FROM MOBILE TERMINAL NODES ON RANDOM ACCESS CHANNEL
3B-ON-DEMAND CONNECTION WITH MOBILE TERMINAL NODES FOR TWO-WAY COMMUNICATIONS (E.G. PERIODIC HEARTBEAT, SENSOR DATA, ACKNOWLEDGMENT, CONFIGURATION PARAMETERS)
4B-EVENT-DRIVEN TRANSMISSION OF MOBILE TERMINAL NODE CONNECT/DISCONNECT MESSAGE (**) (BASED ON PRESENCE/ABSENCE OF PERIODIC MOBILE TERMINAL NODE HEARTBEAT) TO CENTRAL SERVER VIA WIRED PORT (E.G. SPI. RS-232) TO MOBILE TERMINAL NODE "PART/PORTION" OF HYBRID DEVICE

MOBILE TERMINAL NODE "PART/PORTION" EXECUTES THE FOLLOWING PROCESSES:
1B-CONTINUOUSLY LISTENS FOR NETWORK INFRASTRUCTURE NODE BEACONS
2B-USES THE BEACON TO EVALUATE THE RSSI, TOF OR OTHER RF LINK PARAMETERS WITH NETWORK INFRASTRUCTURE NODES WHICH HAVE BACKHAUL NETWORKING AND TRACKING ON
3B-SELECTS THE NEAREST NETWORK INFRASTRUCTURE NODE (WHICH HAS BACKHAUL NETWORKING AND TRACKING ON AND WHOSE RF LINK PARAMETERS MEET THE MINIMUM RF THRESHOLDS SPECIFIED IN ITS BEACON)

4B-RECEPTION OF MESSAGES(**) FROM NETWORK INFRASTRUCTURE NODE "PART/PORTION" OF HYBRID DEVICE VIA WIRED PORT (E.G. SPI. RS-232)

5B-TRANSMITS MESSAGES(*)+(**) ON THE RANDOM ACCESS CHANNEL OF THE SELECTED NEAREST NETWORK INFRASTRUCTURE NODE (PREFERABLY) OR ANY OTHER NODENETWORK INFRASTRUCTURE NODE WITH:

6B-ESTABLISHES TWO-WAY CONNECTION WITH THE SELECTED NEAREST NETWORK INFRASTRUCTURE NODE (PREFERABLY) OR ANY OTHER NETWORK INFRASTRUCTURE NODE AND EXCHANGES PERIODIC HEARTBEAT;

Hardware options of the Hybrid Infrastructure-Mobile Nodes:

Hardware Platform Option #1: All processes in Flow Chart #3 are implemented using the same microcontroller and transceiver. Power is supplied by a rechargeable battery, line power, a primary battery or an energy harvesting mechanism.

Hardware Platform Option #2: All processes related to the mobile terminal node "part/portion" are implemented on the same hardware platform as a normal mobile terminal node, and all processes related to the network infrastructure node "part/portion" are implemented on the same hardware platform as a normal network infrastructure node. Both hardware platforms are inter-connected by a wired SPI, UART or RS-232 port. Power is supplied by a rechargeable battery, line power, a primary battery or an energy harvesting mechanism.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method of reducing energy consumption of network infrastructure nodes in a wireless network, wherein the wireless network comprises the network infrastructure nodes and mobile terminal nodes comprising a receiver and a transmitter, wherein the network infrastructure nodes are mounted at fixed locations and are powered by an autonomous yet limited power supply and wherein the mobile terminal nodes are mobile with respect to the network infrastructure nodes and are configured to communicate with the network infrastructure nodes, the method comprising, for each of the network infrastructure nodes:

a) turning a transmitter and a receiver of the network infrastructure node to a power-off state;
b) powering-on the transmitter of the network infrastructure node for a limited transmission time frame;
c) during the transmission time frame, transmitting a beacon message comprising an identifier of the network infrastructure node, channel characteristics of the network infrastructure node and a powering-on schedule of the receiver of the network infrastructure node, for allowing mobile terminal nodes in the network to communicate with the network infrastructure node at least during a limited time frame in accordance with the schedule, wherein the power consumption of network infrastructure nodes is significantly reduced at the expense of using more power consumption in mobile terminal nodes by almost continuously maintaining the receiver of the mobile terminal nodes in a power-on state;
d) powering-on the receiver of the network infrastructure node and the transmitter of the mobile terminal nodes during a limited reception time frame in accordance with the schedule received by the mobile terminal node, for enabling the receiver of the network infrastructure node to receive messages transmitted by the mobile terminal nodes in the network if required;
e) repeating steps a) to d) periodically.

2. The method as claimed in claim 1, wherein the wireless network comprises a tracking wireless network.

3. The method as claimed in claim 1, wherein the autonomous power supply is at least one battery, an energy harvesting mechanism, or a combination thereof.

4. The method as claimed in claim 1, wherein the wireless network comprises an ad-hoc, multi-node wireless network.

5. The method as claimed in claim 1, wherein the wireless network comprises a wireless sensor network.

6. A network infrastructure node in a wireless network, the wireless network comprising network infrastructure nodes mounted at fixed locations and being powered by an autonomous yet limited power supply, and mobile terminal nodes comprising a receiver and a transmitter which are mobile with respect to the network infrastructure nodes and which are configured to communicate with the network infrastructure nodes, the network infrastructure node comprising:

a transmitter;
a receiver;
a processing unit operatively connected to the transmitter and the receiver and configured to turn the transmitter and the receiver of the network infrastructure node to a power-off state, to power-on the transmitter of the network infrastructure node for a limited transmission time frame, to transmit, during the transmission time frame, a beacon message comprising an identifier of the network infrastructure node, channel characteristics of the network infrastructure node and a powering-on schedule of the receiver of the network infrastructure node for allowing mobile terminal nodes in the network to communicate with the network infrastructure node at least during a limited time frame in accordance with the schedule received from at least one of the network infrastructure nodes, the transmitter of the mobile terminal nodes being powered-on in accordance with the schedule received from at least one of the network infrastructure nodes and to power-on the receiver of the network infrastructure node during a limited reception time frame in accordance with the schedule for enabling the receiver of the network infrastructure node to receive messages transmitted by the mobile terminal nodes in the network if required, wherein the power consumption of network infrastructure nodes is significantly reduced at the expense of using more power consumption in mobile terminal nodes by almost continuously maintaining the receiver of the mobile terminal nodes in a power-on state;
an autonomous yet limited power supply for supplying power to the transmitter, the receiver and the processing unit.

7. The network infrastructure node as claimed in claim 6, wherein the wireless network comprises a tracking wireless network.

8. The network infrastructure node as claimed in claim 6, wherein the autonomous power supply is at least one battery, an energy harvesting mechanism, or a combination thereof.

9. The network infrastructure node as claimed in claim 6, wherein the wireless network comprises an ad-hoc, multi-node wireless network.

10. The network infrastructure node as claimed in claim 6, wherein the wireless network comprises a wireless sensor network.

11. A wireless network comprising a plurality of network infrastructure nodes and a plurality of mobile terminal nodes, the wireless network being configured to reduce energy consumption of the network infrastructure nodes at the expense of using more energy consumption of the mobile terminal nodes by almost continuously maintaining the receiver of the mobile terminal nodes in a power-on state, most of the network infrastructure nodes being powered by an autonomous yet limited power supply, the network infrastructure nodes being mounted at fixed locations, the mobile terminal nodes being mobile with respect to the network infrastructure nodes, the mobile terminal nodes being configured to communicate with the network infrastructure nodes, wherein the network infrastructure nodes are configured to be continuously in a power-off state except during prescheduled reception and transmission time frames, and wherein mobile terminal nodes are configured to be almost continuously in a power-on state, wherein the mobile terminal nodes and the network infrastructure nodes exchange messages therebetween at least during a limited time frame in accordance with the schedule in order for each mobile terminal node to be connected to one network infrastructure node in the network.

12. The wireless network as claimed in claim 11, wherein the wireless network is a tracking wireless network.

13. The wireless network as claimed in claim 11, wherein the autonomous power supply is at least one battery, an energy harvesting mechanism, or a combination thereof.

14. The wireless network as claimed in claim 11, wherein the wireless network comprises an ad-hoc, multi-node wireless network.

15. The wireless network as claimed in claim 11, wherein the wireless network comprises a wireless sensor network.

16. A non-transitory computer-readable medium containing instructions for controlling at least one processor to perform a method of reducing energy consumption in an autonomously powered network infrastructure node in a wireless network comprising network infrastructure nodes and mobile terminal nodes comprising a receiver and a transmitter, wherein the network infrastructure nodes are mounted at fixed locations and are powered by an autonomous yet limited power supply, and wherein the mobile terminal nodes are mobile with respect to the network infrastructure nodes and are configured to communicate with the network infrastructure nodes, the method comprising:

a) turning a transmitter and a receiver of the network infrastructure node to a power-off state;

b) powering-on the transmitter of the network infrastructure node for a limited transmission time frame;

c) during the transmission time frame, transmitting a beacon message comprising an identifier of the network infrastructure node, channel characteristics of the network infrastructure node and a powering-on schedule of the receiver of the network infrastructure node, for allowing mobile terminal nodes in the network to communicate with the network infrastructure node at least during a limited time frame in accordance with the schedule, wherein the power consumption of network infrastructure nodes is significantly reduced at the expense of using more power consumption in mobile terminal nodes by almost continuously maintaining the receiver of the mobile terminal nodes in a power-on state;

d) powering-on the receiver of the network infrastructure node and the transmitter of the mobile terminal nodes during a limited reception time frame in accordance with the schedule, for enabling the receiver to receive messages transmitted by the mobile terminal nodes in the network if required;

e) repeating steps a) to d) periodically.

17. A method as claimed in claim 1, further comprising the step of:

f) transmitting a connect/disconnect message to a central server connected to at least one of the network infrastructure nodes based on a presence/absence of exchange of messages between the mobile terminal nodes and the network infrastructure nodes.

18. A method as claimed in claim 17, wherein the transmission of connect/disconnect messages to the central server is done via the network infrastructure nodes.

19. A method as claimed in claim 1, wherein the energy consumption of the mobile terminal nodes is not minimized.

20. A method as claimed in claim 11, wherein the energy consumption of the mobile terminal nodes is not minimized.

* * * * *